United States Patent
He

(10) Patent No.: US 7,471,510 B2
(45) Date of Patent: Dec. 30, 2008

(54) APPARATUS FOR FASTENING DATA STORAGE DEVICE

(75) Inventor: Chun-Min He, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 12/000,971

(22) Filed: Dec. 19, 2007

(65) Prior Publication Data

US 2008/0174950 A1   Jul. 24, 2008

(30) Foreign Application Priority Data

Jan. 18, 2007   (TW) .............................. 96101910 A

(51) Int. Cl.
G06F 1/16 (2006.01)
(52) U.S. Cl. .................... 361/685; 248/359; 312/223.2; 360/97.02
(58) Field of Classification Search ............... 248/65, 248/73, 213.2, 359; 312/223.1, 223.2; 206/307; 360/97.02, 254.7, 256; 211/26.2; 174/262; 361/679–687, 724–727
See application file for complete search history.

(56) References Cited

U.S. PATENT DOCUMENTS

| 5,574,604 | A | * | 11/1996 | Berg et al. ................ 360/254.8 |
| 6,377,449 | B1 | | 4/2002 | Liao et al. |
| 6,456,491 | B1 | * | 9/2002 | Flannery et al. ............. 361/685 |
| 6,791,829 | B1 | | 9/2004 | Chen et al. |
| 6,948,967 | B2 | | 9/2005 | Scherer et al. |
| 7,061,756 | B2 | * | 6/2006 | Wu ............................ 361/685 |
| 2005/0099767 | A1 | | 5/2005 | Wu |

* cited by examiner

Primary Examiner—Hung V Duong
(74) Attorney, Agent, or Firm—Bacon & Thomas, PLLC

(57) ABSTRACT

The invention relates to an apparatus for fastening a data storage device, which is used to fasten a data storage device or module with a plurality of fixing holes. The apparatus for fastening a data storage device of the invention includes a housing, a driving plate, at least one lateral fastening plate, and an elastic member. As the driving plate moves, the lateral fastening plate is pushed to move laterally, whereby the locating pins move into or out of the locating holes on the sidewalls of housing to remove or fasten the data storage device. The data storage device can be fastened to a housing of a computer without screws, and a user can operate more conveniently.

11 Claims, 6 Drawing Sheets

APPARATUS FOR FASTENING DATA STORAGE DEVICE

BACKGROUND OF THE INVENTION

1. Field of the Invention

The invention relates to an apparatus for fastening a data storage device and, more particularly, to an apparatus for fastening the data storage device of a computer.

2. Description of the Related Art

At present, a computer mostly consists of a host cooperated with data storage devices, such as a hard disk drive, an optical disk drive, a floppy disk drive or a card reader module, etc. The present method for fastening those data storage devices into the predetermined housing of the host always utilizes screws. The conventional fastening method, as shown in FIG. 1, is placing those data storage devices 103 into the interior housing 104 of the housing 101 of a host 100, and fastening the data storage devices 103 to the housing 100 by four to six screws 102 which pass through screw holes 105 in the housing 104 and fixing holes 106 in the data storage devices 103.

However, by this fastening method, tools should be used to lock or remove screws for assembling or disassembling the data storage devices, so that the assembling or disassembling process is time-consuming and laborious. Therefore, a simple, convenient, and timesaving method or apparatus for fastening a data storage device is needed to make the assembling and disassembling convenient.

SUMMARY OF THE INVENTION

An objective of the invention is to provide an apparatus for fastening a data storage device, and the apparatus for fastening a data storage device saves time for fixing the data storage device to a host, simplifies steps for disassembling and assembling, decreases usage of extra tools, avoids using screws, and accomplishes the fixing with simple configuration.

To achieve the above objective, the invention discloses an apparatus for fastening a data storage device having a plurality of fixing holes in a preferred embodiment, and the apparatus for fastening a data storage device includes a housing, a driving plate, at least a lateral fastening plate, and an elastic member.

The housing includes at least a leading unit, a plurality of locating holes, a bottom plate, and at least two sidewalls, wherein the bottom plate is disposed between the sidewalls for forming a holding space for the data storage device, the leading unit is disposed on the bottom plate, and the locating holes are on the sidewalls.

The driving plate cooperates with the bottom plate includes a plurality of side edges, a front edge, at least a connecting edge and at least a sliding unit, wherein the connecting edge is disposed between the front edge and the side edge, and the sliding unit cooperates with the leading unit of the housing.

The lateral fastening plate includes a protrudent piece and a plurality of locating pins which protrude from the lateral fastening plate.

The elastic member connects the housing and the lateral fastening plate, whereby the lateral fastening plate is adjacent to the sidewall, and the protrudent piece of the lateral fastening plate is adjacent to the driving plate. The locating pins of the lateral fastening plate are capable of moving into or out of the locating holes of the sidewalls by the elastic member pulling the lateral fastening plate. The elastic member in the preferred embodiment of the invention is preferred to be a spring, but it is not limited. In order to hold the elastic member, the preferred protrudent piece of the lateral fastening plate provides a holding gap, selectively.

The leading unit on the bottom plate of the housing can guide the movement direction of the driving plate. Since the side edges or the connecting edge of the driving plate is adjacent to the protrudent piece of the lateral fastening plate, when the driving plate moves under the bottom plate along the leading unit, the side edges or the connecting edge of the driving plate can push the lateral fastening plate to cause the pull of the elastic member, so that the locating pins are moved into or out of the locating holes.

In one preferred embodiment of the invention, the leading unit is preferred to be a leading groove or a leading hole, but it is not limited. In addition, the sliding unit is preferred to be a block, but it is not limited.

In one preferred embodiment of the invention, there is no limitation about the configuration of the protrudent piece on the lateral fastening plate, and the protrudent piece is preferred to be perpendicularly formed on one side of the lateral fastening plate. In addition, the protrudent piece and the lateral fastening plate can be components which are separable and combinative with each other, or they can be an integrally formed component. There is no limitation about the shape of the protrudent piece, and in a preferred embodiment, the protrudent piece is a trapezoid-shaped protrudent piece, one side of which can be adjacent to the side edges and connecting edge of the driving plate.

Furthermore, in one preferred embodiment of the invention, the side edges and the connecting edge of the driving plate can be preferred to be linear edges for smoothly pushing the driving plate.

In one preferred embodiment of the invention, the bottom plate selectively provides a concave or a cavity, and the driving plate selectively provides a restricting block; when the sliding unit of the driving plate moves along the leading unit of the bottom plate, and the restricting block of the driving plate moves to the concave or cavity of the bottom plate, they cooperate with each other and restrict the movement of the driving plate.

In one preferred embodiment of the invention, the lateral fastening plate selectively includes at least a guiding pin which is protrudently formed on the lateral fastening plate, and the sidewalls of the housing include at least a guiding hole corresponding to the guiding pin. When the lateral fastening plate cooperates with the sidewalls of the housing, the guiding pin cooperates with the guiding hole of the sidewalls; when the driving plate is moved and pushes the lateral fastening plate, the guiding pin is moved along the guiding hole of the sidewalls to guide the movement direction of the lateral fastening plate. There is no limitation about the shape of the guiding pin in the preferred embodiment of the invention, and the guiding pin is preferred to be cylindraceous or conical, which can make the guide more smoothly.

In the preferred embodiment of the invention, the sidewalls of the apparatus for fastening a data storage device selectively provide a fastening hook for cooperating with the lateral fastening plate, thereby the rotatory angle of the lateral fastening plates is restricted when the lateral fastening plate is pushed by the driving plate. In this way, the lateral fastening plate is not separated from the sidewalls of the housing when the pushing force of the driving plate is too great.

In the preferred embodiment of the invention, the number of the lateral fastening plate of the apparatus for fastening a data storage device has no limitation, and is preferred to be one or two, and when there are two lateral fastening plates, they are symmetrically provided outside the two sidewalls of the housing.

The apparatus for fastening a data storage device in the embodiments of the invention does not need screws for fastening, and this saves time for fixing the data storage device to a host, simplifies steps for disassembling and assembling apparatuses for fastening, decreases usage of extra tools, and accomplishes the fixing with simple configuration. The apparatuses for fastening a data storage device in the embodiments of the invention apply to any computer which needs an apparatus for fastening a data storage device, and they have more advancement than those in conventional technology.

DETAILED DESCRIPTION OF THE PREFERRED EMBODIMENT

Embodiment 1

Figure 1:
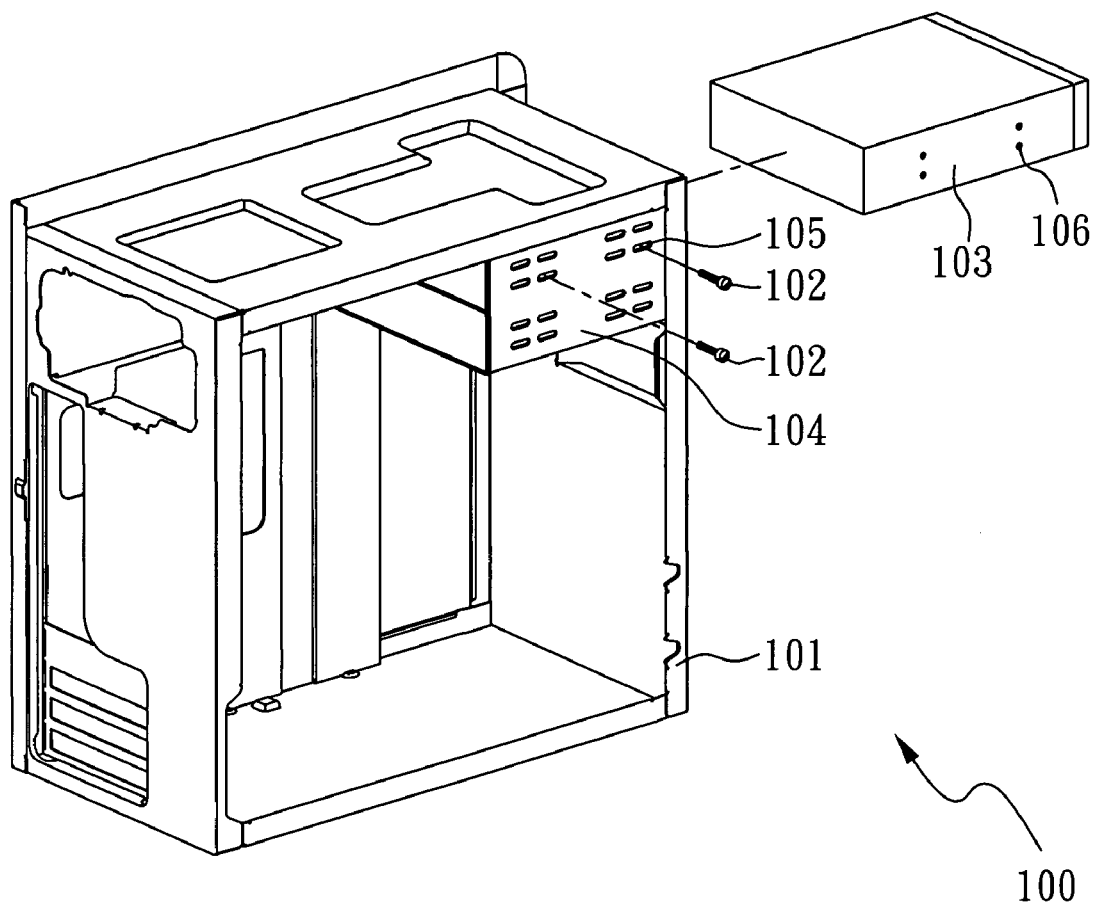
FIG. 1 is a schematic diagram showing a conventional apparatus for fastening a data storage device.
Figure 2:
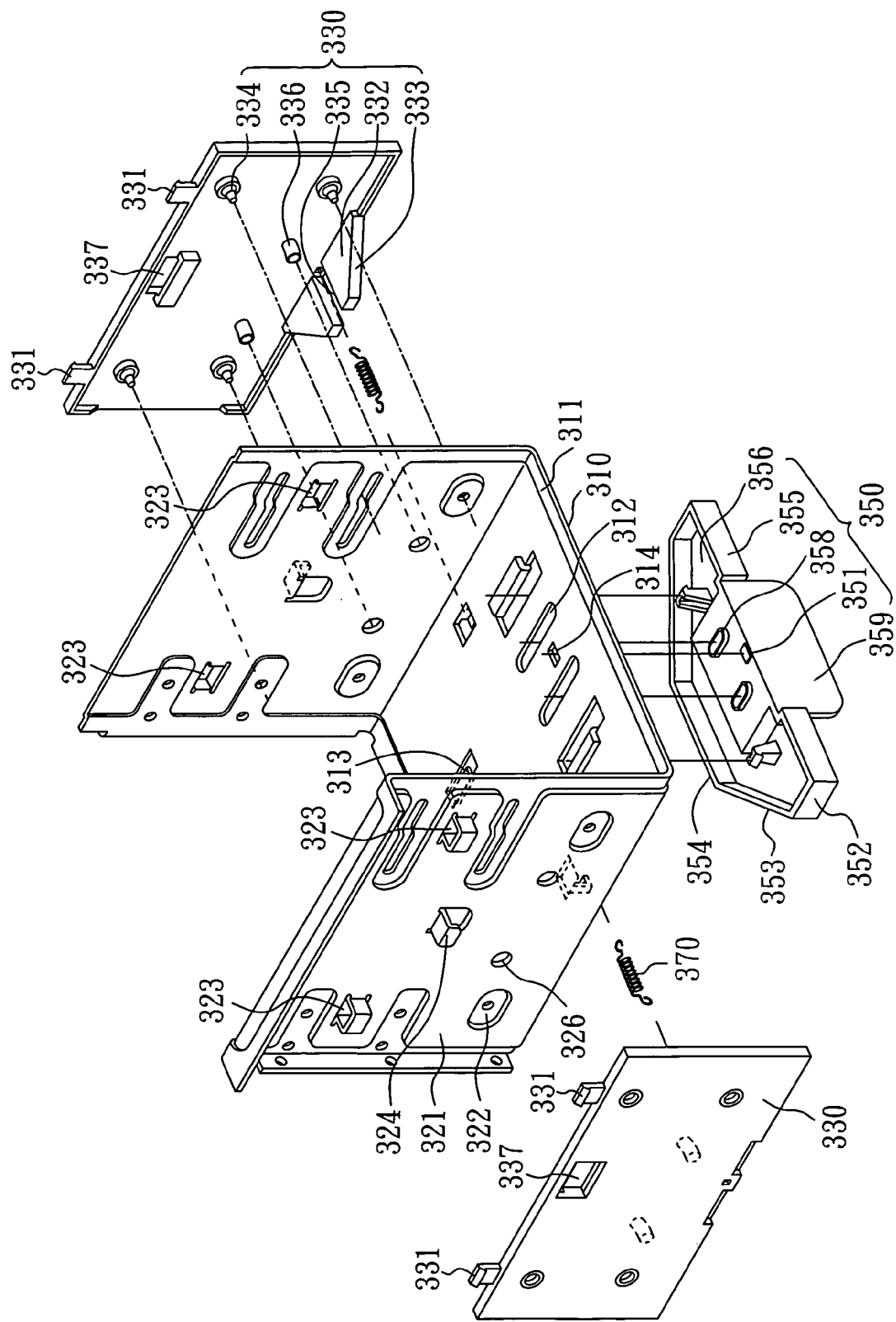
FIG. 2 is a diagram showing the disassembled components of the apparatus for fastening a data storage device in the preferred embodiment 1.

FIG. 2 is a diagram showing the disassembled components of the apparatus for fastening a data storage device of this embodiment.

The apparatus for fastening a data storage device of the embodiment applies to the housing of a computer host to fasten at least one data storage device or module which has a plurality of fixing holes.

In the present embodiment, elements of the apparatus for fastening a data storage device are shown in FIG. 2, and the elements include a housing 310, a driving plate 350, two lateral fastening plates 330, and two elastic members 370.

In the embodiment, the housing 310 includes a bottom plate 311 and two sidewalls 321, and the two sidewalls 321, which are symmetrically provided at two opposite sides of the bottom plate 311, are combined with the bottom plate 311 to form a space for holding one to three data storage devices or modules.

The bottom plate 311 has four leading grooves 312 as leading units, and the sidewalls 321 have a plurality of locating holes 322, a plurality of guiding holes 326, and at least a fastening hook 324.

The driving plate 350 of the embodiment is an approximate trapezoid-shaped plate which includes a front edge 354, a back edge 355, two side edges 352, two connecting edges 353, and a bottom surface 356. Wherein the connecting edges 353 of the driving plate 350 are disposed between the front edge 354 and the side edges 352, and the connecting edges 353, the front edge 354, and the side edges 352 are all linear edges.

Furthermore, a plurality of protrudent sliding elements, such as sliding blocks 358 are provided at the bottom surface 356 of the driving plate 350, whereby the driving plate 350 is assembled with the leading grooves 312 of the bottom plate 311 of the housing 310, and the driving plate 350 can move or slide under the bottom plate 311. In addition, a pushing plate 359 protruding from the bottom surface 356 is further provided at the driving plate 350, so that the driving plate 350 can be moved by pushing or pulling conveniently.

In addition, the bottom plate 311 in the embodiment further has a cavity 314 which cooperates with the restricting block 351 on the driving plate 350, and when there is no action, the cavity 314 cooperating with the restricting block 351 can avoid the movement of the driving plate 350 or restrict the movement distance of the driving plate 350 under the bottom plate 311. Accordingly, along the movement direction of the driving plate 350, a locating block 313 is provided on the other side from the cavity 314 of the bottom plate 311. When the driving plate 350 moves a predetermined distance along the leading grooves 312, the locating block 313 prevents the front edge 354 of the driving plate 350 from going on moving; thereby the movement distance of the driving plate 350 along the leading grooves 312 is restricted. In other words, the driving plate 350 can move back and forth between the locating block 313 and the cavity 314.

In the embodiment, the apparatus for fastening a data storage device includes two lateral fastening plates 330 which are provided at the external sides of the two sidewalls 321 of the housing 310, respectively.

Trapezoid-shaped protrudent pieces 332 protruding toward one side of the sidewalls 321 are provided on the lateral fastening plates 330, which have two bevel edges 333 and a holding gap 335, and are perpendicularly formed at one side of the bottom of the lateral fastening plates 330 with which the trapezoid-shaped protrudent pieces 332 are integrated. The trapezoid-shaped protrudent pieces 332 are assembled at the two bottom sides of the bottom plate 311 by springs 370 which act as elastic elements in the holding gaps 335, and the bevel edges 333 of the trapezoid-shaped protrudent pieces 332 are adjacent to the two connecting edges 353 of the driving plate 350 and can act as the moving path of the driving plate 350.

Meanwhile, in the embodiment, the upside edge of the lateral fastening plates 330 may further include two protrudent hooks 331, and when the lateral fastening plates 330 are adjacently combined with the sidewalls 321, the protrudent hooks 331 can be jointed with the corresponding crooks 323 on the sidewalls 321, whereby the fastening hooks 324 on the sidewalls 321 are jointed with the jointed openings 337 on the lateral fastening plates 330 to increase stability of the lateral fastening plates 330. The fastening hooks 324 on the sidewalls 321 assembled with the lateral fastening plates 330 can guide and restrict the rotatory angle of the lateral fastening plates 330 pushed by driving plate 350.

Positions of locating holes 322 on each sidewall 321 of the housing 310 are corresponding to those of fixing holes on a data storage device and locating pins 334 on the lateral fastening plates 330.

In the embodiment, the lateral fastening plates 330 further include four locating pins 334 and at least two guiding pins 336. Positions of the four locating pins 334 are corresponding to those of the locating holes 322 on sidewalls 321, and when the lateral fastening plates 330 are adjacently combined with the sidewalls 321, the locating pins 334 of the lateral fastening plates 330 can pass through the locating holes 322 on sidewalls 321. If a data storage device having a plurality of fixing holes (not shown) is provided in the housing 310, the locating pins 334 can further pass through the fixing holes to fasten the data storage device. Meanwhile, guiding pins 336 protrudent to and formed on the lateral fastening plates 330 can also be inserted into the guiding holes 326 on the lateral fastening plates 330 when the lateral fastening plates 330 are moved, whereby each locating pin 334 on the lateral fastening plates 330 can move along the correct jointing direction.

In the embodiment, the guiding pins 336 on the lateral fastening plates 330 may have a cylindraceous or conical shape whose top surface is narrower than its bottom surface, which facilitates the guiding pins 336 on the lateral fastening plates 330 to easily slide into the guiding holes 326 on the sidewalls 321 to guide the movement direction of the lateral fastening plates 330.

Figure 3:
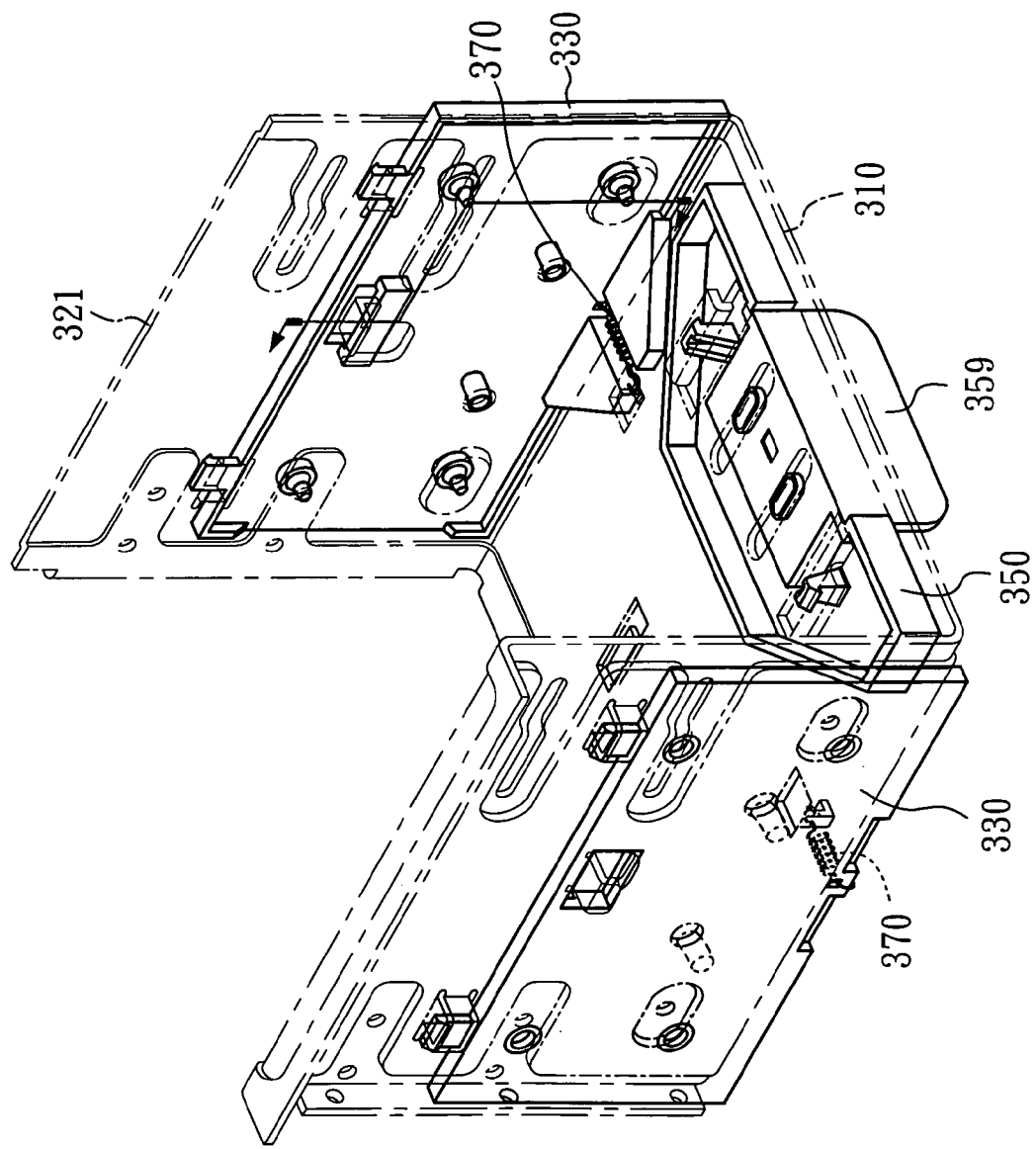
FIG. 3 is a diagram showing the assembly of the apparatus for fastening a data storage device in the preferred embodiment 1.

The configuration of the apparatus for fastening a data storage device mentioned above after assembly and before usage is shown in FIG. 3.

Figure 4:
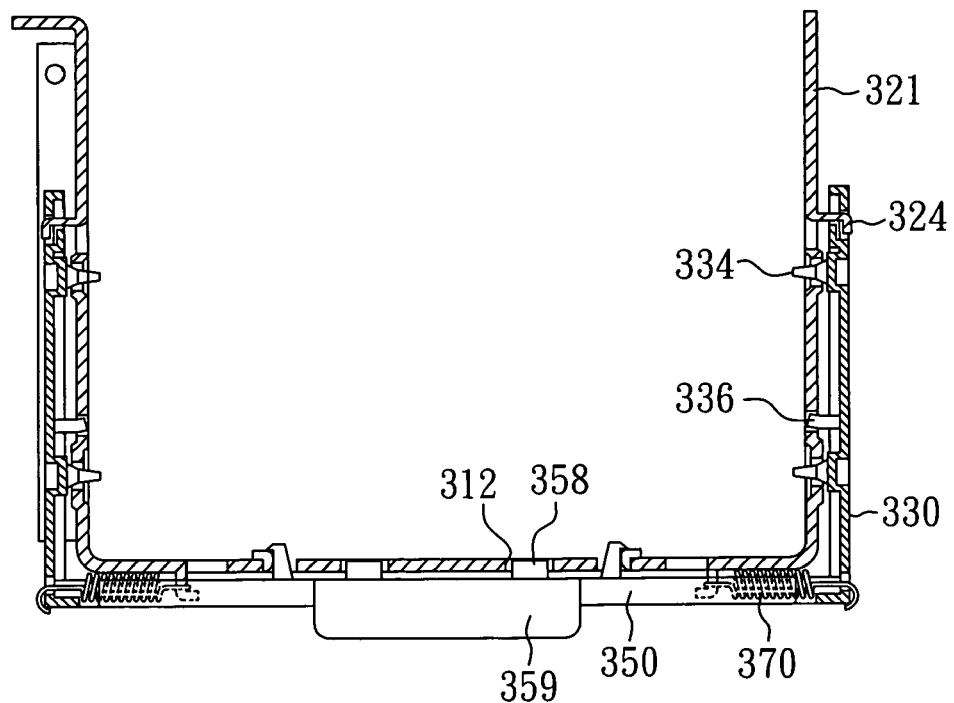
FIG. 4 is a cross-sectional view showing the apparatus for fastening a data storage device in the preferred embodiment 1.
Figure 5:
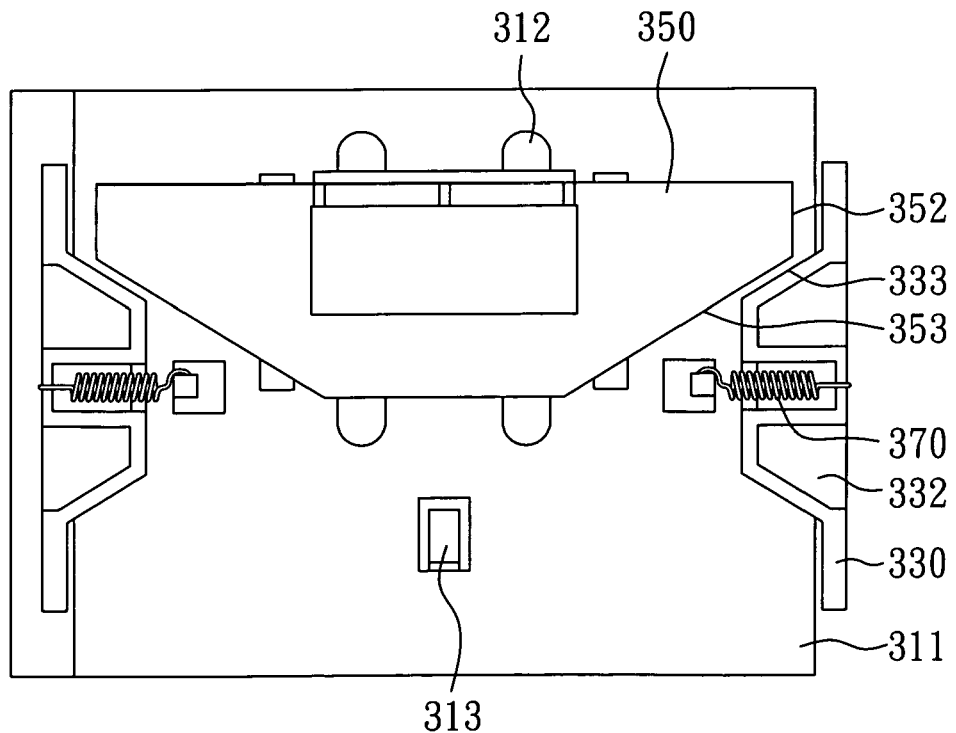
FIG. 5 is a upward view showing the apparatus for fastening a data storage device in the preferred embodiment 1.

Positions of each element of the above apparatus for fastening a data storage device without action are shown in the cross-sectional view of FIG. 4 and the upward view of FIG. 5.

When the above apparatus for fastening a data storage device is not using, the lateral fastening plates 330 is abutted against the sidewalls 321 of the housing 310, and the locating pins 334 and the guiding pins 336 on the lateral fastening plates 330 are fastened with the locating holes 322 and the guiding holes 326 on the sidewalls 321, and the fastening hooks 324 and crooks 323 on the sidewalls 321 are clasped with the jointed openings 337 and the protrudent hooks 331 on the lateral fastening plates 330.

Meanwhile, the sliding blocks 358 of the driving plate 350 is connected with the leading grooves 312 of the bottom plate 311 of the housing 310, and then the connecting edges 353 of the driving plate 350 are adjacently abutted against the bevel edges 333 of the trapezoid-shaped protrudent pieces 332.

Leading grooves 312 of the bottom plate 311 can guide the movement direction of the driving plate 350. When the driving plate 350 moves back and forth under the bottom plate 311 along the leading grooves 312, the side edges 352 or connecting edges 353 of the driving plate 350 also move back and forth along side edges of the trapezoid-shaped protrudent piece 332. By moving the trapezoid-shaped protrudent piece 332, the locating pins 334 on the lateral fastening plates 330 is therefore moved into or out of the locating holes 322 on the sidewalls 321 along the locating holes 322, hence, the data storage devices can be placed into or take out from the housing 310.

Figure 6:
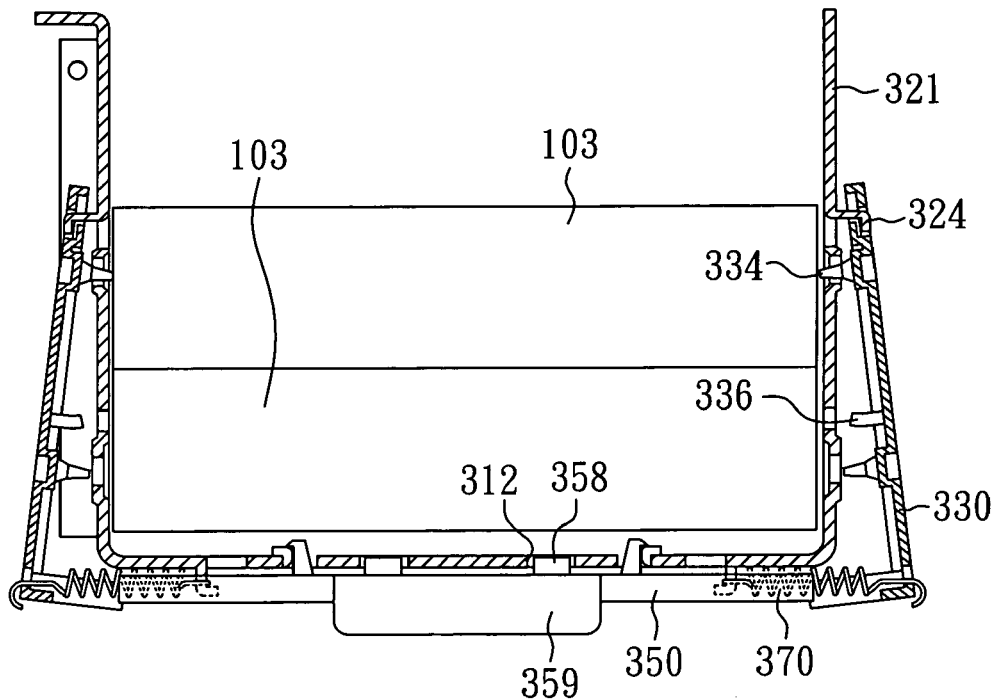
FIG. 6 is a cross-sectional view showing that the driving plate pushes away lateral fastening plates by moving forward in the preferred embodiment 1 of the apparatus for fastening a data storage device.
Figure 7:
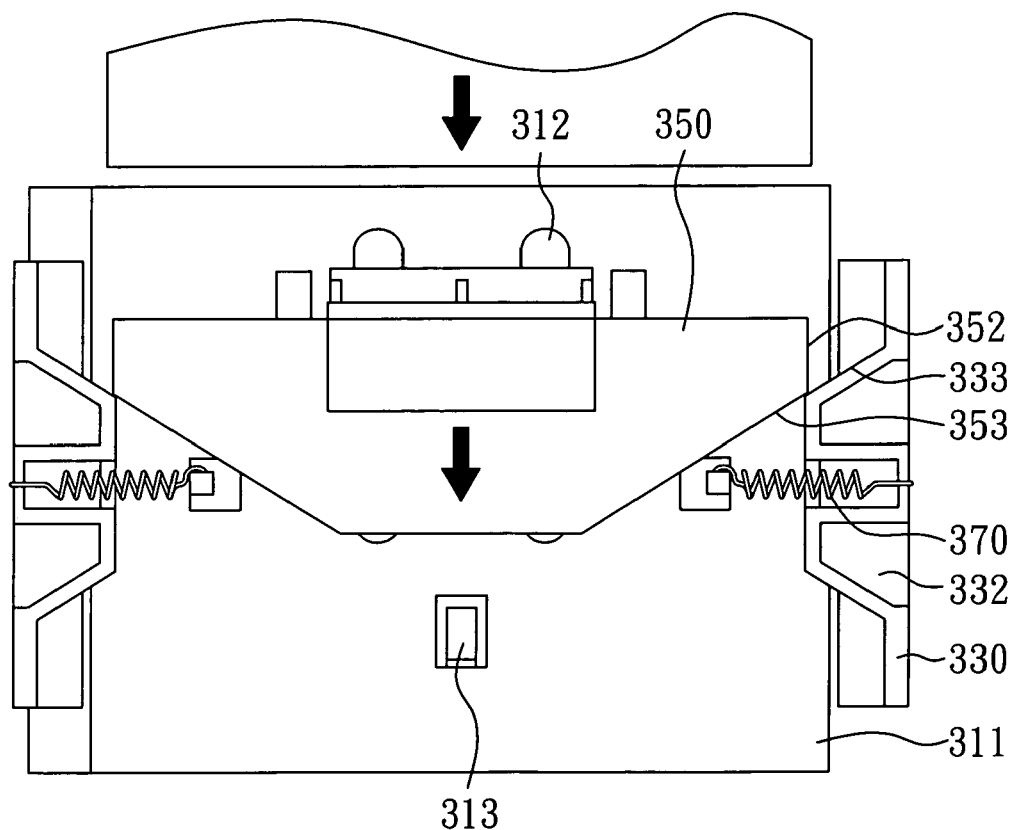
FIG. 7 is a upward view showing that the driving plate pushes away lateral fastening plates by moving forward in the preferred embodiment 1 of the apparatus for fastening a data storage device.

Both FIG. 6 and FIG. 7 show that the driving plate of an apparatus for fastening a data storage device pushes away lateral fastening plates by moving forward, where the FIG. 6 is cross-sectional view and FIG. 7 is upward view.

For example, to fasten a data storage device is into the apparatus for fastening a data storage device 103 in the embodiment, a force should be applied on the pushing plate 359 of the driving plate 350 first, to push away the restricting block 351 of the driving plate 350 from the cavity 314. Since the driving plate 350 is jointed with the leading grooves 312 through the sliding blocks 358, pushing the pushing plate 359 makes the driving plate 350 move along the guiding direction of the leading grooves 312.

In the embodiment, since the connecting edges 353 of the driving plate 350 are adjacent to the bevel edges 333 of the trapezoid-shaped protrudent pieces 332 of the lateral fastening plates 330, when the driving plate 350 is pushed to move along the direction of arrow signs, the trapezoid-shaped protrudent pieces 332 are pushed to move toward outside of the driving plate 350, so that the whole lateral fastening plates 330 rotates toward outside of the sidewalls 321. The rotary axes of the lateral fastening plates 330 are on the fastening hooks 324 of the sidewalls 321, and the lateral fastening plates 330 rotate around the rotary axes which are approximately parallel to the movement direction of the driving plate 350. Another function of the fastening hooks 324 is to prevent the lateral fastening plates 330 from disassembling by external force. The rotations of the lateral fastening plates 330 drive the locating pins 334 to move out of the locating holes 322, and the rotary directions may not be deflective with the restriction of the guiding pins 336.

When the driving plate 350 continuously moves forward, and the linear side edges 352 of the driving plate 350 contact the linear top edges of the trapezoid-shaped protrudent pieces 332, the locating pins 334 can be moved out of the locating holes 322. At this time, the data storage device 103 can be placed or taken out. When the locating pins 334 move out of the locating holes 322, the rotary angles of the lateral fastening plates 330 are not too large with the restriction of the fastening hooks 324 on sidewalls 321 and the also the elastic force of the springs 370. When pushed to the position where the locating pins 334 are moved out of the locating holes 322, the driving plate 350 never moves forward for the restriction of the locating block 313, and therefore is prevented from being pushed out of the bottom plate 311.

After the data storage device 103 is placed or taken out, a force can be applied to the pushing plate 359 in a opposite direction, or the elastic force of the springs 370 is used to restore the positions of the locating pins 334 according to an reversed sequence of the steps described above. That is, when the driving plate 350 moves toward the cavity 314, and the connecting edges 353 of the driving plate 350 are adjacent to the bevel edges 333 of the trapezoid-shaped protrudent pieces 332 of the lateral fastening plates 330, the trapezoid-shaped protrudent pieces 332 move inward from the two sides of the driving plate 350. The lateral fastening plates 330 as a whole rotate toward insides of the sidewalls 321 via the movement of the trapezoid-shaped protrudent pieces 332. The locating pins 334 are moved into the locating holes 322 via the rotations of the lateral fastening plates 330. The rotary directions may not be deflective with the guiding restriction of the guiding pins 336. When the driving plate 350 keeps moving back, the locating pins 334 can be inserted into the locating holes 322.

Embodiment 2

Figure 8:
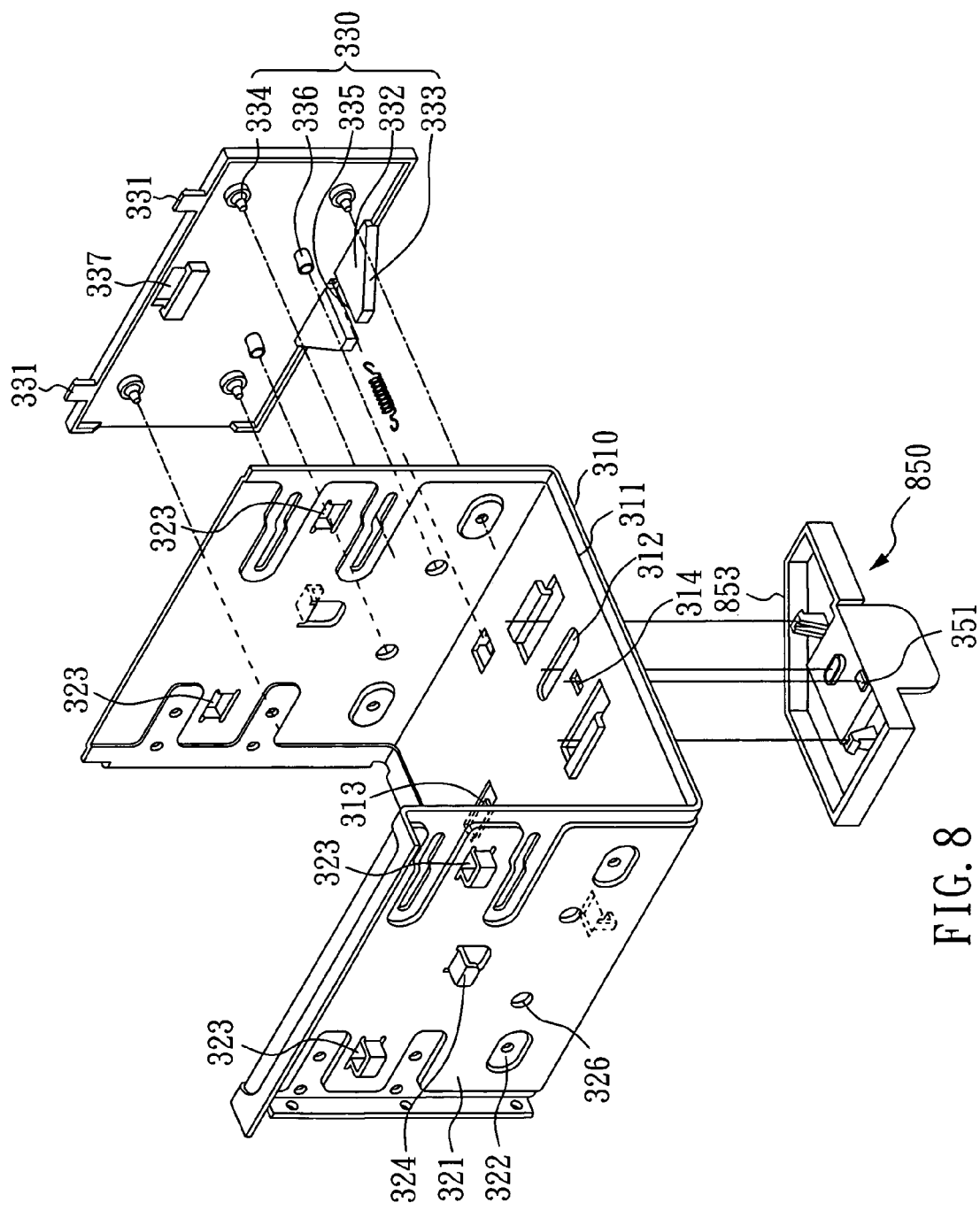
FIG. 8 is a diagram showing the disassembled components of the apparatus for fastening a data storage device in the preferred embodiment 2.

As shown in FIG. 8, the apparatus for fastening a data storage device in the embodiment 2 is similar to that in the embodiment 1, except that a driving plate 850 includes only one connecting edge 853 which is adjacent to the trapezoid-shaped protrudent piece 332 of a lateral fastening plate 330, and only one lateral fastening plate 330 is provided. Other elements and actions of the elements are similar to those of the apparatus for fastening a data storage device in the embodiment 1, but the apparatus for fastening a data storage device in the embodiment 2 only uses locating pins 334 on one lateral fastening plate 330 for fastening. The apparatus for fastening a data storage device in the embodiment applies to the data storage device with lower stability requirement.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An apparatus for fastening a data storage device comprising:
   a housing having at least a leading unit, a plurality of locating holes, a bottom plate, and two sidewalls, wherein the bottom plate is provided between the sidewalls to form a holding space for the data storage device, the leading unit is provided on the bottom plate, and the locating holes are on both the sidewalls;
   a driving plate having a plurality of side edges, a front edge, two connecting edges, and at least a sliding unit, wherein the connecting edges are provided between the front edge and the side edges;
   at least a lateral fastening plate having a protrudent piece and a plurality of locating pins; and
   an elastic member connected to the housing and the lateral fastening plate, whereby the lateral fastening plate is adjacent to one of the sidewalls;
   wherein the sliding units of the driving plate cooperate with the leading units of the housing, and when the driving plate slides along the leading units by the sliding units, the side edges or the connecting edges of the driving plate push the lateral fastening plate, whereby the locating pins on the lateral fastening plate move into or out of the locating holes of the sidewalls.

2. The apparatus for fastening a data storage device according to claim 1, wherein the leading units are leading grooves or leading holes.

3. The apparatus for fastening a data storage device according to claim 1, wherein the sliding units are blocks.

4. The apparatus for fastening a data storage device according to claim 1, wherein the protrudent piece of the lateral fastening plate is perpendicularly formed at one side of the lateral fastening plate.

5. The apparatus for fastening a data storage device according to claim 4, wherein the protrudent piece is a trapezoid-shaped protrudent piece.

6. The apparatus for fastening a data storage device according to claim 1, wherein a restricting block is provided at the driving plate to restrict the movement of the driving plate.

7. The apparatus for fastening a data storage device according to claim 1, wherein the lateral fastening plate further comprises a guiding pin.

8. The apparatus for fastening a data storage device according to claim 7, wherein the guiding pin is cylindraceous or conical.

9. The apparatus for fastening a data storage device according to claim 1, wherein a fastening hook is further formed at the sidewalls.

10. The apparatus for fastening a data storage device according to claim 1, wherein the elastic member is a spring.

11. The apparatus for fastening a data storage device according to claim 1, wherein the number of the lateral fastening plate is two, and the two lateral fastening plates are symmetrically provided outside the two sidewalls of the housing.

* * * * *